March 17, 1970     H. K. SCHILLING     3,500,970
BRAKE HAVING SPRING ENGAGEMENT AND FLUID PRESSURE RELEASE
Filed Dec. 6, 1967
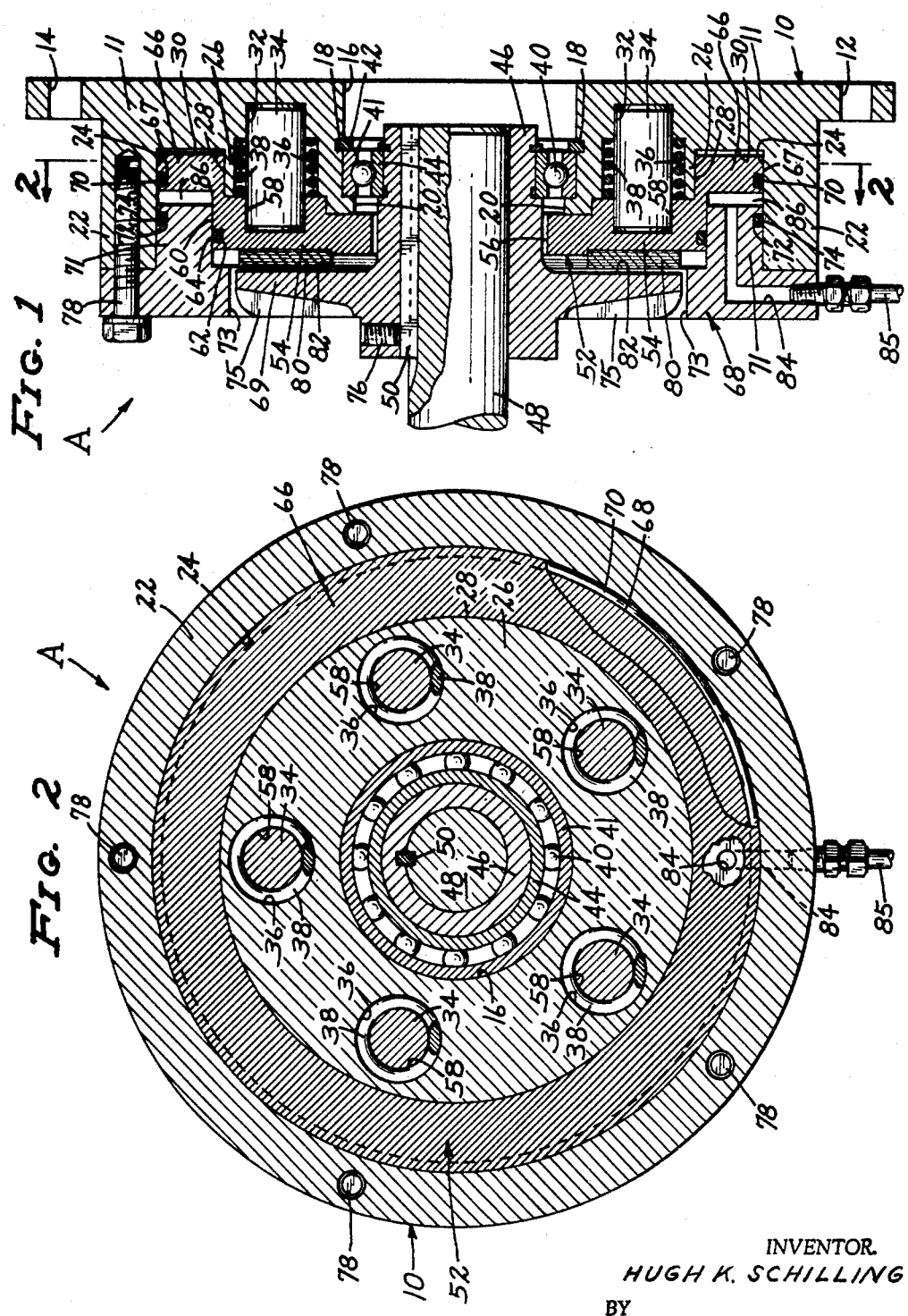
INVENTOR.
HUGH K. SCHILLING
BY
Carlsen, Carlsen, Sturm & Wickes
ATTORNEYS United States Patent Office 3,500,970
Patented Mar. 17, 1970

3,500,970
BRAKE HAVING SPRING ENGAGEMENT AND
FLUID PRESSURE RELEASE
Hugh K. Schilling, St. Paul, Minn., assignor to Horton
Manufacturing Company, Inc., Minneapolis, Minn., a
corporation of Minnesota
Filed Dec. 6, 1967, Ser. No. 688,509
Int. Cl. B60t 13/04, 13/22
U.S. Cl. 188—170                                 2 Claims

ABSTRACT OF THE DISCLOSURE

The disclosure relates to a brake having a stationary base member formed of first and second body portions, the body portions having an annular cylinder formed therein in which is positioned an annular piston formed as part of a circular plate which carries a friction ring. The circular plate is slidably mounted on a plurality of spaced shoulder pins secured to the stationary base member. Mounted on each of the shoulder pins is a coil spring which normally urges the friction ring of the circular plate into braking contact with a brake disc mounted on a shaft to be braked. The stationary base member has a conduit for fluid pressure leading to the cylinder for actuating the piston to position and hold the friction ring out of contact with the brake disc. Upon a lowering or loss of fluid pressure, the springs cause the friction ring of the circular plate to brake the brake disc and thereby brake the shaft.

SUMMARY OF THE INVENTION

The invention relates generally to brakes for use with stationary industrial machines and more particularly to a fluid operated brake having braking means which is applied upon the loss of fluid pressure which actuates the brake. It is an object of the invention to provide a brake having a single brake disc which may be selectively with a relatively large diameter due to the construction of the stationary base member. It is a further object of the invention to provide a brake which is actuated to a non-braking position by means of fluid pressure acting upon an annular piston, and upon the loss of pressure a plurality of internal compression springs cause a braking action. It is also an object of the invention to provide a brake having the brake actuating springs mounted on shoulder pins positioned on and internally of the stationary base member, the should pins transferring torque from the brake disc to the stationary base member.

These and other more detailed and specific objects will be disclosed in the course of the following specification, reference being had to the accompanying drawings, in which—

FIG. 1 is a longitudinal section of the brake embodying the invention.

FIG. 2 is a sectional view on the line 2—2 of FIG 1.

Referring to the drawings in detail, the brake A includes the stationary base member 10 which is secured to a stationary support (not shown) by means of bolts positioned in the holes 12 and 14. The base 10 includes a first anular body portion 11 which is formed with the axial circular opening 16 the surface of which is formed with the annular recess 18. The inner extent of the opening 16 terminates in the annular flange 20. The annular body portion 11 also includes the outer annular wall portion 22 the inner annular surface 24 of which forms an outer annular chamber wall. Also formed on the annular body portion 11 is the annular boss 26 the outer surface of which forms an inner annular chamber wall 28 concentric with the surface 24 thereby forming the annular chamber 30. The annular flange 20 is formed as part of the boss 26.

The annular boss 26 has formed therein a plurality of circular openings 36, five being shown. The body portion 11 is formed with five spaced holes 32 in each of which is secured a torque absorbing and piston carrying pin 34. The pins 34 extend through the holes 36 of the boss 26 and outwardly of the holes 36 and annular boss 26. The pins form extension means for the plate and piston carried thereon and hereinafter described. Positioned on each of the pins 34 and extending within an opening 36 is an internal compression coil spring 38.

The numeral 40 designates a bearing the outer race 41 of which is press fit in the opening 16 and abutting the annular flange 20. The bearing 40 is further positioned and secured by the annular ring 42 mounted in the annular recess 18 and against the race of the bearing. The inner race 44 of the bearing is press fit on the hub 46 keyed to the shaft 48 by means of the key 50. It will be noted that the bearing 40 is in radial alignment with the shoulder pins 36.

Further provided is a single plate member 52 which includes the circular base portion 54 formed with the axial opening 56 and which is of a diameter slightly greater than the diameter of the hub 46 with respect to which it axially moves. Formed in the disc base portion 54 are a plurality of recesses 58 in alignment with the pins 36. The pins are slidable within the companion recesses 58. The outer annular edge 60 of the base portion 54 is formed with the recess 62 in which is positioned an O-ring 64. Extending axially and radially outwardly from the base 54 is the annular piston 66 which has formed on the outer surface thereof the recess 67 in which is positioned the O-ring 70. The annular piston 66 extends slidably into the annular chamber 30 with the O-ring 70 contacting the cylinder wall 24. The piston 66 is in radial alignment with the pins 36 and the bearing 40.

The numeral 68 designates a second annular body portion of the stationary base member 10. The body portion 68 includes the annular shoulder 71 extending therefrom which has formed on the outer annular surface thereof the recess 72 in which is mounted the O-ring 74 for sealing engagement with the inner annular surface 24 of the first body portion 11. The inner annular surface of the annular shoulder 71 is in sealing engagement with the O-ring 64 and edge 60 of the base portion 54. The body portion 68 is also formed with the axial opening 73.

Extending radially from the hub 46 is the single brake disc 69 positioned within opening 73 of the body portion 68 and on which is formed the spaced and radially extending heat dissipating fins 75.

The hub 46 is further secured to the shaft 48 by means of the screw 76. The second body portion 68 is secured to the first body portion 11 by means of a plurality of spaced bolts 78 extending through the body portion 68 and threadedly engaging the annular wall portion 22. Secured to the circular base portion 54 of the plate member 52 is the ring 80 of friction material which is contactable for braking engagement with the radially extending surface 82 of the brake disc 69. The springs 38 normally urge the friction ring of plate member 52 upon the brake disc 69. Further it will be seen that the compression springs 38 are internal of the plate member 52 and are positioned between the base portion 54 of the plate member 52 and the body portion 11 and within the openings 36.

The second annular body portion 68 has formed therein the fluid conduit 84 which extends through the shoulder 71 and leads into the cylinder 86 formed between the piston 66 and the shoulder 71. A supply line 85 of fluid pressure is connected to the fluid conduit 84.

When fluid pressure is introduced into the conduit 84 by means of supply line 85 pressure is exerted on the annular piston 66 which forces the plate member 52 away from the disc 69 and maintains the friction ring 30 free of the brake disc 69 thereby allowing shaft 48 to rotate. With the loss or lowering of fluid pressure in the cylinder 86 the springs 38 cause the friction ring 30 of the plate member 52 to be urged against the brake disc 69 and stop the shaft. It will be noted that the shoulder pins 36 transfer torque evenly from the brake disc 72 to and evenly throughout the stationary base member 10. Due to the construction of the body portion 68 of the base member 10 the radial extent of the brake disc 69 may be increased by increasing the outward radial extent of the opening 73 in the body portion 68 to accommodate a brake disc of a larger diameter.

Having now therefore fully illustrated and described my invention, what I claim to be new and desire to protect by Letters Patent is:

1. A releasable brake for restraining relative rotation between revolvable means and fixed means rotatably supporting said revolvable means,
  (a) said fixed means including
  (b) a base member having
  (c) a first annular body portion and
  (d) an annular wall portion extending axially outwardly therefrom,
  (e) said wall portion having a bore therein concentric with the axis of said revolvable means,
  (f) a second annular body portion overlying said first body portion and spaced axially therefrom and secured thereto,
  (g) an annular shoulder on said second body portion extending into the bore of the annular wall portion and having
  (h) an outer surface in fluid tight sliding contact with the surface formed by said bore,
  (i) said second annular body portion having a hole in the center of the same and
  (j) a bore disposed outwardly of said hole and extending toward said first body portion and of lesser diameter than said bore in said annular shoulder,
  (k) said shoulder falling short of said first body portion to leave a space therebetween,
  (l) an annular plate member received in the bore of said second annular body portion and having
  (m) an outer surface in fluid tight sliding contact with the bore of said second annular body portion,
  (n) an annular piston extending outwardly from the portion of said plate received in the bore of said shoulder and received in said space between the first and second body portion, and having
  (o) an outer surface in fluid tight sliding contact with the surface formed by the bore in said first body portion,
  (p) said plate having a radial surface,
  (q) said fixed means including
  (r) a member fixed relative to said revolvable means and having
  (s) a radial surface facing the radial surface of said plate,
  (t) friction brake means between said surfaces,
  (u) resilient means for urging said plate toward said brake member to resist rotation of said revolvable means,
  (v) means for directing fluid under pressure into the space between said shoulder and piston to move said plate away from said brake member and free said revolvable means and
  (w) rotary motion restraining means between said plate and said fixed means.

2. A releasable brake for restraining relative rotation between revolvable means and fixed means rotatably supporting said revolvable means,
  (a) said fixed means including
  (b) a radially extending base member,
  (c) an annular plate member disposed adjacent said base member,
  (d) said revolvable means including
  (e) a brake disc fixed relative thereto and
  (f) disposed adjacent said plate member,
  (g) friction brake means between said brake disc and said plate member,
  (h) said brake disc and plate member having corresponding facing parts with facing bores arranged in the form of a circle concentric with the axis of the revolvable means,
  (i) pins snugly fitting in the corresponding bores of said disc and plate and slidable relative to one of said parts,
  (j) compression coil springs encircling said pins and engaging said parts to urge said brake disc and plate into braking engagement with said friction brake means and
  (k) expansible fluid means acting on said plate member to move said plate member away from the brake disc to release the brake.

References Cited

UNITED STATES PATENTS

| | | | |
|---|---|---|---|
| 2,698,676 | 1/1955 | Eason | 188—170 |
| 2,700,439 | 1/1955 | Hodgson | 188—171 |
| 3,082,647 | 3/1963 | Banker | 188—170 X |

FOREIGN PATENTS

| | | |
|---|---|---|
| 456,678 | 11/1936 | Great Britain. |
| 934,142 | 8/1963 | Great Britain. |

DUANE A. REGER, Primary Examiner

U.S. Cl. X.R.

188—71